United States Patent

[11] 3,625,913

| [72] | Inventor | Jerry Donald Hunt<br>Cuyahoga Falls, Ohio |
|---|---|---|
| [21] | Appl. No. | 827,059 |
| [22] | Filed | May 22, 1969 |
| [45] | Patented | Dec. 7, 1971 |
| [73] | Assignee | The Firestone Tire & Rubber Company<br>Akron, Ohio |

[54] "N'-ALKYL, AND N'-ARYL-N-FLUORENYL-P-PHENYLENE-DIAMINES AS ANTIOZONANTS IN NATURAL AND SYNTHETIC DIENE RUBBERS"
9 Claims, No Drawings

[52] U.S. Cl. .................................................. 260/33.6 AQ,
152/353, 260/45.8 A, 260/45.8 N, 260/45.8
NZ, 260/45.9 R, 260/576, 260/731, 260/759,
260/809
[51] Int. Cl. ...................................................... C08f 45/28,
C08f 45/60

[50] Field of Search ............................................. 260/45.9,
45.8 NO, 45.8 N, 576, 731, 809, 33.6, 759

[56] References Cited
UNITED STATES PATENTS

| 2,691,642 | 10/1954 | Faulkner ...................... | 260/45.9 |
|---|---|---|---|
| 3,157,615 | 11/1964 | Stahly .......................... | 260/45.9 |
| 3,507,826 | 4/1970 | Lal et al. ...................... | 260/45.9 |

Primary Examiner—Donald E. Czaja
Assistant Examiner—Eugene C. Rzucidlo
Attorneys—S. M. Clark and Willard L. G. Pollard ABSTRACT: N'-alkyl- and N'-aryl-N-fluorenyl-p-phenylenediamines are new compounds. They are antiozonants in natural and synthetic diene rubbers.

N'-ALKYL, AND N'-ARYL-N-FLUORENYL-P-PHENYLENE-DIAMINES AS ANTIOZONANTS IN NATURAL AND SYNTHETIC DIENE RUBBERS

N'-alkyl-and N'-aryl-N-fluorenyl-p-phenylenediamines are new. They act as antiozonants when added to natural and synthetic diene rubbers.

The alkyl groups of the N'-alkyl-N-fluorenyl-p-phenylenediamines include saturated hydrocarbons of one to 20 carbon atoms, including for instance, methyl, ethyl, propyls, butyls, pentyls, octyls, decyls, dodecyls, stearyl, etc. as well as cyclobutyl, cyclohexyl, cyclooctyl, etc. The alkyl derivatives include also nitrogen- and oxygen-containing heterocyclic groups as, for example, morpholinyl, piperidinyl, pyrrodinyl, hexamethylene-iminyl, 2,6-dimethylmorpholinyl, etc. They include also the hydroxy and alkoxyl derivatives of alkyl groups of one to 20 carbon atoms in which the alkyl of the alkoxy groups contain one to four carbon atoms. The hydroxy and alkoxy groups may be attached to any carbon of the alkyl group and include, for example, hydroxymethyl, methoxymethyl, 1-hydroxylbutyl, 2-pentoxyoctyl, 9-hydroxydecyl, etc.

The aryl groups of the N'-aryl-N-fluorenyl-p-phenylenediamines include, for example, phenyl, naphthyl, tolyl, propylphenyl, butylphenyl, xylyl, benzyl, phenethyl, biphenyl, alpha and beta ethyl naphthyl, o-, m- and p-methyl biphenyl, fluorenyl, indanyl and other benzenoids and hydroxy and alkoxy derivatives thereof in which the alkoxy groups include one to four carbon include and the hydroxy and alkoxy groups may be attached at any position on the ring or in the side chain as alpha or beta hydroxyethylphenyl, etc. The term "benzenoid" is used herein to include benzene and fused benzenoid rings which may be joined directly or indirectly and may include side chains.

The rubbers that are stabilized include natural rubber and synthetic diene rubbers including polybutadiene, polyisoprene, butadiene-styrene copolymer, butadiene-isoprene copolymer, etc.

The antiozonants are added in any usual amount, such as, for example, 0.5 to 10 percent of the weight of the rubber an preferably from 1 to 5 percent.

The following examples are illustrative.

EXAMPLE I

N'-Phenyl-N-Fluorenyl-Para-Phenylenediamine
The preparation is illustrated by the following equation:

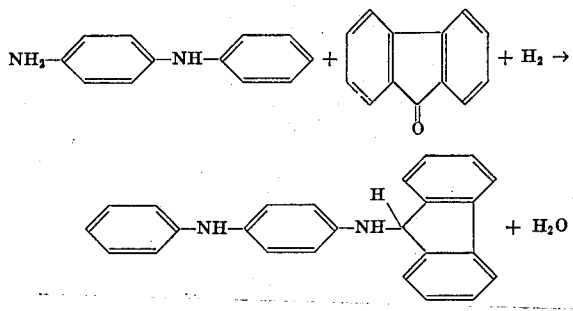

The following materials were added to a Parr shaker apparatus:
27.6 g. (0.15 mole) p-aminodiphenylamine
27.0 g. (0.15 mole) 9-fluorenone
1.5 ml. glacial acetic acid
0.15 g. $PtO_2$ (Adam's catalyst)
100 ml. absolute ethanol The acetic acid and platinum oxide serve as catalyst and the ethanol serves merely as a solvent. The apparatus was placed under 50 p.s.i. (pounds per square inch) of hydrogen. After 18 hours the theoretical amount of hydrogen (0.15 mole) had reacted and the reaction was stopped. The catalyst was filtered and solvent was evaporated, leaving the N'-phenyl-N-fluorenyl-paraphenylene diamine. The melting point was 87–91° C. IR (infrared) and NMR (Nuclear Magnetic Resonance) determinations verified the structure of the product.

EXAMPLE II

N'-Isopropyl-N-Fluorenyl Para-Phenylenediamine
The preparation is illustrated by the following equation:

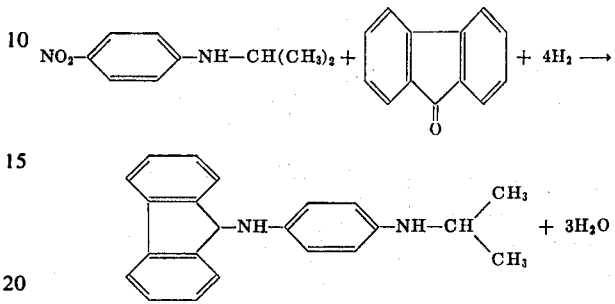

The following materials were added to a Parr shaker apparatus:
27.0 g. (0.15 mole) N-isopropyl-p-nitro-aniline
27.0 g. (0.15 mole) 9-fluorenone
0.2 g. $PtO_2$ (Adam's catalyst)
2.5 ml. glacial acetic acid
100 ml. absolute ethanol The vessel was placed under 50 p.s.i. of hydrogen. After 0.6 mole of hydrogen had reacted (3.5 hours) the reaction was stopped, the catalyst filtered, and the solvent evaporated. The resulting product is N'-isopropyl-N-fluorenyl para-phenylenediamine. Melting point 85–87° C. The IR and NMR spectra verified the structure of the compound.

The fluorenyl derivatives of this invention can be used as antiozonants in diene rubbers. The following examples are illustrative of their use in oil-extended tire sidewall stocks, but it is to be understood that other fluorenyl derivatives included generally herein may be similarly utilized as antiozonants and any of the fluorenyl derivatives of the invention may be used as antiozonants in other rubber compounds, including tread stocks, hose, motor mounts, conveyor belts, etc. The rubber in the examples is composed at least largely of butadiene-styrene copolymer.

The antiozonants of this invention may be used alone or in combination with other antiozonants and with antioxidants. The rubber stocks may include other reinforcing agents than carbon blacks as, for example, silica, but it is not necessary that a reinforcing agent by included.

ANTIOZONANT EVALUATIONS OF THE EXPERIMENTAL COMPOUNDS

The two antiozonants of examples I and II were compounded in a general formula and a commercial antiozonant Santoflex 77 (N,N'-di-secondary heptyl paraphenylenediamine) was similarly compounded, and the different stocks were tested against a blank containing no antiozonant. The formula used is set forth in the following table. The formula need not include any reclaim but may include as much as 22.5 percent of reclaim and at least 77.5 percent diene rubber.

|  | Stock | | | | |
| --- | --- | --- | --- | --- | --- |
|  | A | B | C | D | E |
| SBR | 121.0 | 121.0 | 121.0 | 121.0 | 121.0 |
| Reclaim [1] | 28.0 | 28.0 | 28.0 | 28.0 | 28.0 |
| Black | 68.0 | 68.0 | 68.0 | 68.0 | 68.0 |
| Zinc oxide | 2.0 | 2.0 | 2.0 | 2.0 | 2.0 |
| Stearic acid | 0.5 | 0.5 | 0.5 | 0.5 | 0.5 |
| Processing oil | 11.0 | 11.0 | 11.0 | 11.0 | 11.0 |
| Sulfur | 2.0 | 2.0 | 2.0 | 2.0 | 2.0 |
| Accelerator | 1.2 | 1.2 | 1.2 | 1.2 | 1.2 |
| Wax | 5.0 | 5.0 | 5.0 | 5.0 | 5.0 |
| Antiozonant: |  |  |  |  |  |
| Example I |  | 2.5 |  | 1.4 |  |
| Example II |  |  | 2.5 |  | 1.4 |
| Santoflex 77 |  |  |  | 1.4 | 1.4 |

[1] The reclaim was a standard grade of reclaim rubber.

The various stocks were cured at 300° F. The physical properties are given for 23-minute cures and the ozone evaluations were made on the same stocks by treatment in an ozone chamber using 60 p.p.h.m. of ozone. (Except for said larger amount of ozone, the test was ASTM test D-1149-64.) Two ozone tests were conducted; one for 7 hours at 40° F., and the other for 14 hours at 95° F.

STRESS-STRAIN PROPERTIES

|  | A | B | C | D | E |
|---|---|---|---|---|---|
| 300% modulus, p.s.i. | 775 | 775 | 700 | 725 | 700 |
| 400% modulus, p.s.i. | 1,050 | 1,075 | 1,025 | 1,100 | 1,075 |
| Tensile strength | 1,475 | 1,525 | 1,425 | 1,600 | 1,375 |
| Ultimate elongation, percent | 530 | 520 | 540 | 560 | 460 |

OZONE EVALUATION

|  | A | B | C | D | E |
|---|---|---|---|---|---|
| 7 hours at 40° F | Mod | Mod | Mod | (1) | Broke |
| 14 hours at 95° F | (2) | Mod | Mod | (2) | Broke |

[1] Very, very slight.
[2] Slight.

NOTE.—Mod=Moderate.

I claim:

1. A sulfur-cured composition of a diene rubber normally subject to cracking in which the rubber is at least 77.5 percent diene rubber, which composition includes and antiozonant amount of a compound selected from the group consisting of N-fluorenyl-N'-alkyl and N'-aryl-paraphenylenediamines in which (a) the alkyl derivatives include (1) alkyl groups of one to 20 carbon atoms and hydroxyl and alkoxy derivatives thereof in which the alkoxy group contains one to four carbon atoms, and (2) morpholinyl and nitrogen-heterocyclic groups and (b) the aryl derivatives are benzenoid groups and their hydroxy and alkoxy derivatives in which the alkoxy groups contain one to four carbon atoms.

2. The composition of claim 1 in which the antiozonant is N-fluorenyl-N'-phenyl-paraphenylenediamine.

3. The composition of claim 1 in which the antiozonant is N-fluorenyl-N'-isopropyl-paraphenylenediamine.

4. A sulfur-cured, oil-diluted, tire sidewall in which the rubber is 77.5 percent vulcanized butadiene-styrene copolymer, which rubber includes an antiozonant amount of a compound selected from the group consisting of N-fluorenyl-N'-alkyl and N'-aryl-paraphenylenediamines in which (a) the alkyl derivatives include (1) alkyl groups of one to 20 carbon atoms and hydroxyl and alkoxy derivatives thereof in which the alkoxy group contains one to four carbon atoms, and (2) morpholinyl and nitrogen-heterocyclic groups and (b) the aryl derivatives are benzenoid groups and their hydroxy and alkoxy derivatives in which the alkoxy groups contain one to four carbon atoms.

5. The tire of claim 4 in which the antiozonant is N-fluorenyl-N'-phenyl-paraphenylenediamine.

6. The tire of claim 4 in which the antiozonant is N-fluorenyl-N'-isopropyl-paraphenylenediamine.

7. A sulfur-cured, oil-diluted, tire sidewall which is composed at least 77.5 percent of butadiene-styrene copolymer and includes not over 22.5 percent of rubber reclaim and contains an antiozonant amount of a compound selected from the group consisting of N-fluorenyl-N'-alkyl and N'-aryl-phenylenediamines in which (a) the alkyl derivatives include (1) alkyl groups of one to 20 carbon atoms and hydroxyl and alkoxy derivatives thereof in which the alkoxy group contains one to four carbon atoms, and (2) morpholinyl and nitrogen-heterocyclic groups and (b) the aryl derivatives are benzenoid groups and their hydroxy and alkoxy derivatives in which the alkoxy groups contain one to four carbon atoms.

8. The sulfur-cured oil-diluted tire sidewall of claim 7 in which the antiozonant is N-fluorenyl-N'-phenyl-paraphenylenediamine.

9. A sulfur-cured oil-diluted tire sidewall of claim 7 in which the antiozonant is N-fluorenyl-N'-isopropyl-paraphenylenediamine.

* * * * *

UNITED STATES PATENT OFFICE
CERTIFICATE OF CORRECTION

Patent No. 3,625,913            Dated December 7, 1971

Inventor(s) Jerry Donald Hunt

It is certified that error appears in the above-identified patent and that said Letters Patent are hereby corrected as shown below:

Col. 1, Line 29    "include" should be -- atoms --

Col. 1, Line 40    "an" should be -- and --

Col. 2, Line 15, please rewrite this line in the formula as follows:

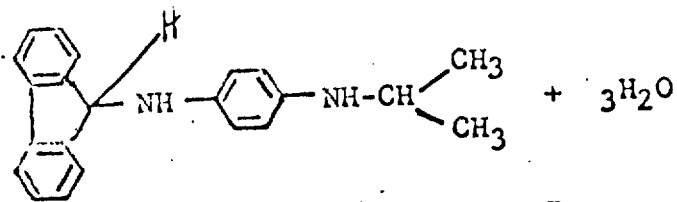

Col. 2, Line 30    "as" should be    -- was --

Col. 2, Line 50    "by" should be -- be --

Col. 3, Line 26    "and" should be -- an --

Col. 4, Line 4    Insert "at least" after -- is --

Signed and sealed this 12th day of September 1972.

(SEAL)
Attest:

EDWARD M. FLETCHER JR.          ROBERT GOTTSCHALK
Attesting Officer                 Commissioner of Patents